Sept. 29, 1925.
S. R. MOTT
SPEED INDICATING DEVICE
Filed Oct. 22, 1923
1,555,309
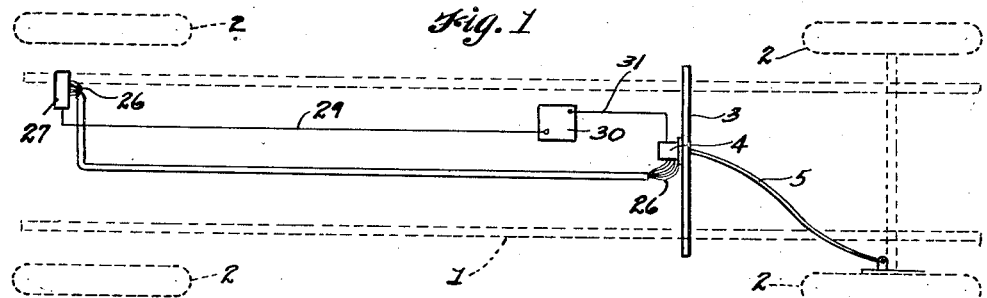
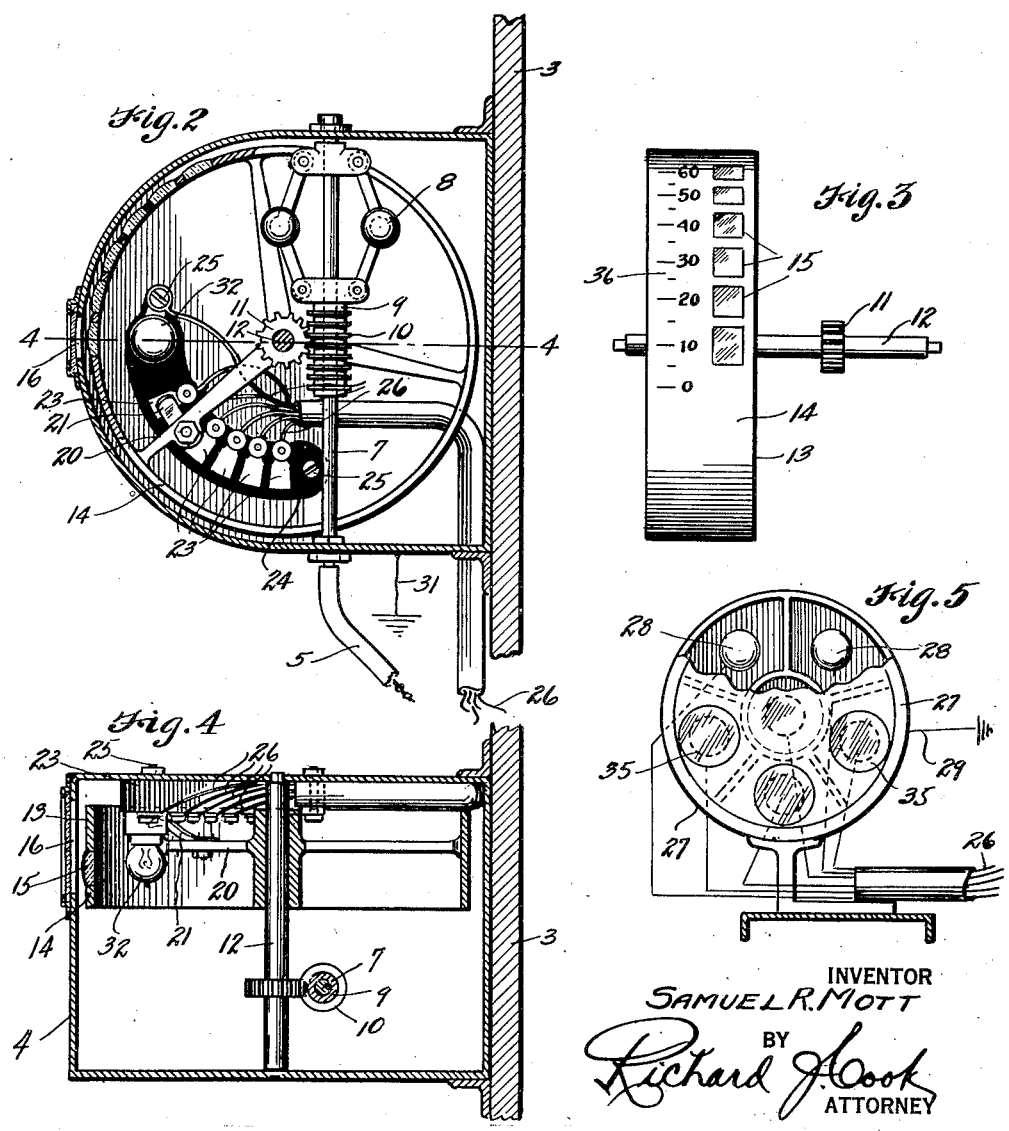
INVENTOR
SAMUEL R. MOTT
BY
Richard J. Cook
ATTORNEY Patented Sept. 29, 1925.

1,555,309

UNITED STATES PATENT OFFICE.

SAMUEL R. MOTT, OF EVERETT, WASHINGTON.

SPEED-INDICATING DEVICE.

Application filed October 22, 1923. Serial No. 669,993.

*To all whom it may concern:*

Be it known that I, SAMUEL R. MOTT, a citizen of the United States, and a resident of Everett, Snohomish County, Washington, have invented certain new and useful Improvements in Speed-Indicating Devices, of which the following is a specification.

This invention relates to improvements in speed indicating devices for use on motor vehicles, and more particularly to means for indicating to the public as well as to the driver, the speed, or approximate speed, at which the vehicle is traveling.

More specifically stated, the invention resides in the provision of a speedometer device of the above character which will indicate different speeds by the use of a series of different colored lights that may be located at desired points on the vehicle.

Other objects of the invention reside in the various details of construction of the speed controlled switch mechanism and in its mode of operation.

In accomplishing the several objects of the invention, I have provided the improved details of construction, the preferred forms of which are illustrated in the accompanying drawings, wherein—

Figure 1 is a diagrammatic view of a vehicle, illustrating the location of the speed indicating devices for the driver and public, with their wiring connections and the connection with a wheel of the vehicle for operating the speedometer.

Figure 2 is a vertical, sectional view through the speedometer and indicating device located on the instrument board of the vehicle.

Figure 3 is a front view of the indicator wheel contained within the speedometer.

Figure 4 is a horizontal section through the indicator housing, taken on the line 4—4 in Figure 2.

Figure 5 is a front elevation of the signal lamp housing, a part of which is broken away for better illustration.

Referring more in detail to the drawings—

1 designates what may be the frame parts of a motor vehicle, 2 the ground wheels and 3 the dash or instrument board, whereon a speedometer device, designated in its entirety by numeral 4, is mounted and which is connected for operation in the usual manner through a flexible shaft 5 that extends therefrom to a driving connection with one of the vehicle wheels.

The shaft 5 connects with the lower end of a shaft 7 that is rotatably mounted within the speedometer housing and which operatively connects with a ball governor device 8 that operates in accordance with the speed of the vehicle to raise and lower a sleeve 9 that is slidably mounted on the shaft 7 and which is provided with a series of annular teeth 10 that are adapted to move in mesh with a gear wheel 11 fixed on a horizontal shaft 12; the latter shaft being rotatably mounted at its ends in the side walls of the speedometer housing and supports an indicator wheel 13.

The wheel 13 is equipped with a relatively wide rim portion 14 wherein there is provided a plurality of spaced apart openings 15 each of which is fitted with a glass or other transparent covering of a color different from the others. These several windows are adapted, upon rotation of the wheel 13, to be successively moved into registration with a window 16 in the front of the speedometer housing.

Supported upon a spoke 20 of the wheel 13 is a yieldable contact plate 21 that is adapted to move, upon rotation of the wheel, successively into circuit closing contact with a series of contact plates 23 that are mounted in spaced apart relation upon an insulating block 24 that is secured within the housing by screws 25. Each of the several contact plates 23 has a circuit wire 26 leading therefrom, and from the housing, into a signal light housing 27 that may be mounted at the front or rear of the vehicle, where said wires connect with a plurality of electrical signal lights 28. The other terminals of these lamps 28 are electrically connected through their housing and by a wire 29 leading from the housing, with one pole of an electric battery 30. Contact plate 21 is electrically connected with the other terminal of the battery through the housing 4 and a wire 31 that leads therefrom.

A lamp 32 is also provided within the housing directly back of window 16, as shown in Figures 2 and 4, and this is likewise electrically connected with the battery so that rays therefrom will illuminate the different colored windows 15 as the latter move into registration with window 16.

The housing 27 is provided with separate compartments, and over the several signal lamps are placed lenses 35 of different color corresponding to the colors of the windows 15. The wiring connections are also so arranged that when a window 15 of any certain color is brought into registration with window 16 in the speedometer housing, a light of that same color will show on the indicator at the rear or front of the vehicle.

I have also provided the speedometer wheel 13 with a surface that is graduated, as at 36 Figure 3, to indicate miles per hour and which may also be observed through window 16 by the driver of the vehicle.

Assuming the device to be so constructed, it is apparent that movement of the vehicle will transmit rotative motion to the governor shaft 7 and this, in accordance with the rate of movement of the vehicle, will cause governor 8 to raise and lower the sleeve 9 whereby the gear 12 will be rotated to thereby effect rotation of the indicator wheel 13. This rotative movement of the wheel will move the contact plate 21 that is fixed to a spoke of the wheel into circuit closing contact with one of the plates 23 to thereby cause an electric circuit to be closed in a corresponding light at the rear of the vehicle. It will also bring one of the windows 15 in the wheel rim into registration with the window 16 in the housing 4 and with the lamp 32 back of this shining through the window the driver may, by observing the color, determine the speed of the vehicle.

As the vehicle moves faster, or slower, the wheel 13 rotates accordingly to close circuits through the other lights and to move the wheel to bring different colored windows into registration with the casing window so that both the driver of the vehicle and the public will know the rate of travel of the vehicle.

Having thus described my invention, what I claim as new therein and desire to secure by Letters-Patent, is:

In a speed indicating signal, a speedometer casing having an opening, a speedometer wheel rotatable within the housing having a rim provided with a plurality of differently colored windows movable into registration with said housing opening, a governor mechanism operatively connected with the vehicle and having gear contact for rotatably moving said wheel to bring different windows into registration with the housing opening at different speeds of the vehicle, a plurality of lights mounted on the vehicle, a series of insulated contact plates mounted in spaced apart relation within said housing and a yieldable contact plate supported upon said wheel and adapted to move upon rotation of said wheel successively into circuit closing contact for closing the circuit through said lights at different speeds of the vehicle whereby one of the differently colored windows of said rim will be brought into registration with the opening in said housing.

Signed at Everett, Snohomish County, Washington, this 18th day of September, 1923.

SAMUEL R. MOTT.